United States Patent [19]

Duff

[11] Patent Number: 4,689,569

[45] Date of Patent: Aug. 25, 1987

[54] DIRECTIONAL ANTENNA SYSTEM FOR USE IN A BOREHOLE INCORPORATING ANTENNA DIPOLE ELEMENTS

[75] Inventor: Bob M. Duff, San Antonio, Tex.

[73] Assignee: Southwest Research Institute, San Antonio, Tex.

[21] Appl. No.: 682,081

[22] Filed: Dec. 17, 1984

[51] Int. Cl.$^4$ .................... G01V 3/30; H01Q 3/30; H01Q 3/02

[52] U.S. Cl. ................................ 324/338; 343/832; 343/873

[58] Field of Search ............... 324/338, 337; 343/785, 343/832, 873

[56] References Cited

U.S. PATENT DOCUMENTS

| | | | |
|---|---|---|---|
| 2,255,520 | 9/1941 | Schuster | 343/832 |
| 3,286,163 | 11/1966 | Holser et al. | 324/338 |
| 4,123,759 | 10/1978 | Hines et al. | 343/832 |
| 4,274,097 | 6/1981 | Krall et al. | 343/873 |

OTHER PUBLICATIONS

Lytle et al., "Design of a Miniature Directional Antenna for Geophysical Probing from Boreholes", IEEE Transactions on Geoscience Electronics, vol. GE-16, No. 4, Oct. 1978, pp. 304-307.

Primary Examiner—Gerard R. Strecker
Assistant Examiner—Walter E. Snow

[57] ABSTRACT

For use in logging a borehole through various formations of the earth, the preferred and illustrated embodiment of an RF transmitter system including antenna placed in the sonde is disclosed. The embodiment sets forth a pair of dipole antennas mounted in a closed chamber on a central support. The chamber is in a cylindrical housing filled with a high dielectric material. The antennas are bowtie dipoles which are fed with separately time delayed pulses (preferably having waveforms of only one cycle) so that the relative time delay between the two antenna inputs and the propagation velocity in the high dielectric medium results in reinforcing addition of the radiated wave in the forward direction and destructive cancellation in the reverse direction to provide a directional azimuthal radiation pattern. The housing is rotated at a slow rate to enable pulses to be transmitted in various directions to map the formations near the borehole.

18 Claims, 4 Drawing Figures

DIRECTIONAL ANTENNA SYSTEM FOR USE IN A BOREHOLE INCORPORATING ANTENNA DIPOLE ELEMENTS

BACKGROUND OF THE DISCLOSURE

This apparatus is directed to a type of radar system having an azimuthal directional antenna system to enable radar mapping of the geologic formations and their structures near a borehold in the earth. It is particularly useful in boreholes which are drilled through several formations where the interface between formations or interfaces therebetween and anomalies are of interest. One such device is shown by Shuck in U.S. Pat. No. 4,045,724. That is a device incorporating a highly directional transmitting antenna in the form of a horn. Other directional antennas suitable for use in a borehole include the structure shown in Gabillard which is U.S. Pat. No. 3,440,523 and Holser U.S. Pat. No. 3,412,815.

The present apparatus is particularly able to determine the presence and location of electromagnetic contrasts in the vicinity of a borehole drilled into geologic formations of the earth. The angular position of such anomolous contrasts is obtained by scanning the radar antenna so that its directional beam pattern is confined to a limited azimuthal zone oriented radially around the axis of the borehole. Distance to the anomaly is derived from knowledge of the electromagnetic wave propagration velocity in the drilled formation and the time delay required for the source energy to travel from the directional source antenna to the reflecting anomaly and return to an associated receiving antenna. If desired, the device can be stopped at a particular position in a borehole and scanned radially around the hole axis. It is desirable that the antenna have a relatively narrow beam. However, the beam should not be so narrow that the full circle of 360° requires a large number of data points. This device sets forth an apparatus having a beam width wherein the beam is fairly definitive in the forward direction and the radiation pattern is substantially zero in the reverse direction, that being 180° opposite from the front direction. At the 90° position relative to the forward direction, beam strength is markedly reduced.

This enables the device to scan a full circle taking eight directional angular zones of view in a typical application. Closer spacing can be obtained by taking a data point every 30° or so. The optimum seems to be about eight angular zones around the borehole axis. This beam provides sufficient definition in the return signals to enable the data to be meaningful.

One advantage of this angular scan spacing is that the device can be raised fairly rapidly in the wellbore. It utilizes an antenna system capable of forming a relatively narrow antenna pattern in a given direction.

This apparatus is able to rotate readily to scan in different azimuthal directions. The antenna structure is mechanically rotatable within its protective housed in a rotating housing. This housing and antenna construction is sized so that it fits neatly into holes drilled into earth materials such as hard rock, sedimentary rock, coal, salt, or other geologic formations. This type of construction permits the continuous rotation of the equipment to take data from different azimuthal directions. Moreover, it enables the antennas to be loaded for purposes of launching eletromagnetic wave radiation. Thus, the device incorporates a mechanism which rotates the antenna system for operation. The antenna fits snugly and neatly within a closed housing. The housing is filled with a liquid in typical applications to thereby increase the relative dielectric surrounding the antenna. This assists in changing the relative time relationship of the antenna elements. In the preferred and illustrated embodiment, the antenna is a pair of adjacent dipoles. The preferred form includes dipoles known as bow-tie dipoles. They are spaced so that a timed relationship in feeding exitation signals to them coupled with the spacing yields the angular selective antenna pattern described herein. Briefly, the dipoles are within a closed housing which is preferably filled with a liquid. Water is acceptable provided the ambient temperature range is not excessive. Water has a relative dielectric as high as 80. If low temperatures are encountered thereby running the risk of freezing of the liquid, the liquid can be composed of a mixture ethylene glycol and water. This will provide a relative dielectric constant of between 44 and 80 depending on the mix of the two liquids. It is also possible to use high dielectric solids such as barium titanate or other ferroelectric ceramics. Materials of this type provide a dielectric in the range of about 1,000 to 3,600. Such high dielectrics are not ordinarily necessary in light of the features, frequencies and spacing used in the device described below.

Through the use of this arrangement, the entire antenna system can be encapsulated within a diameter of three inches or less. This enables the sonde to be placed in a borehole as small as 4¾ inch diameter. Through the use of the time delay in the application of the single cycle pulses applied to the antennas (there being two separate dipoles), and through the further use of the housing filled with a dielectric, thereby changing the propagation velocity, the two antennas are excited individually with separate input signals but they radiate collectively in a fashion which Results in a pulse whose energy is concentrated in the forward direction with reduced strength on the sides and a substantially complete null to the rear.

A suitable operating frequency range of the directional antenna is between about 30 and 300 MHz. Within that range, it appears that the best frequency is approximately 100 MHz. Moreover, it has been determined that the best directional beam pattern is obtain by transmitting only one cycle from each of the two antenna that comprise the antenna system. This yields a pulse in the forward direction of the device, and a substantial null in the reverse direction. This makes the data obtained fairly directional.

With the foregoing in view, the system of the present disclosure incorporates an antenna system in a down hole sonde. The sonde is adapted to be lowered on a logging cable. The logging cable provides a means for transmitting power, control signals, and radar receiver output signals between surface equipment and down hole equipment.

The system further includes bow-tie dipoles, there being two with a particular arrangement between them. They are spaced in a particular fashion to control the phasing of the two radiated signals. The radiated signals are obtained by driving the two antenna dipoles with different timing of the separate antenna exitation signals. Further, the system incorporates a housing mounted on a rotor to enable the rotor to be rotated, thereby repositioning the composite antenna to scan in an azimuthed manner.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
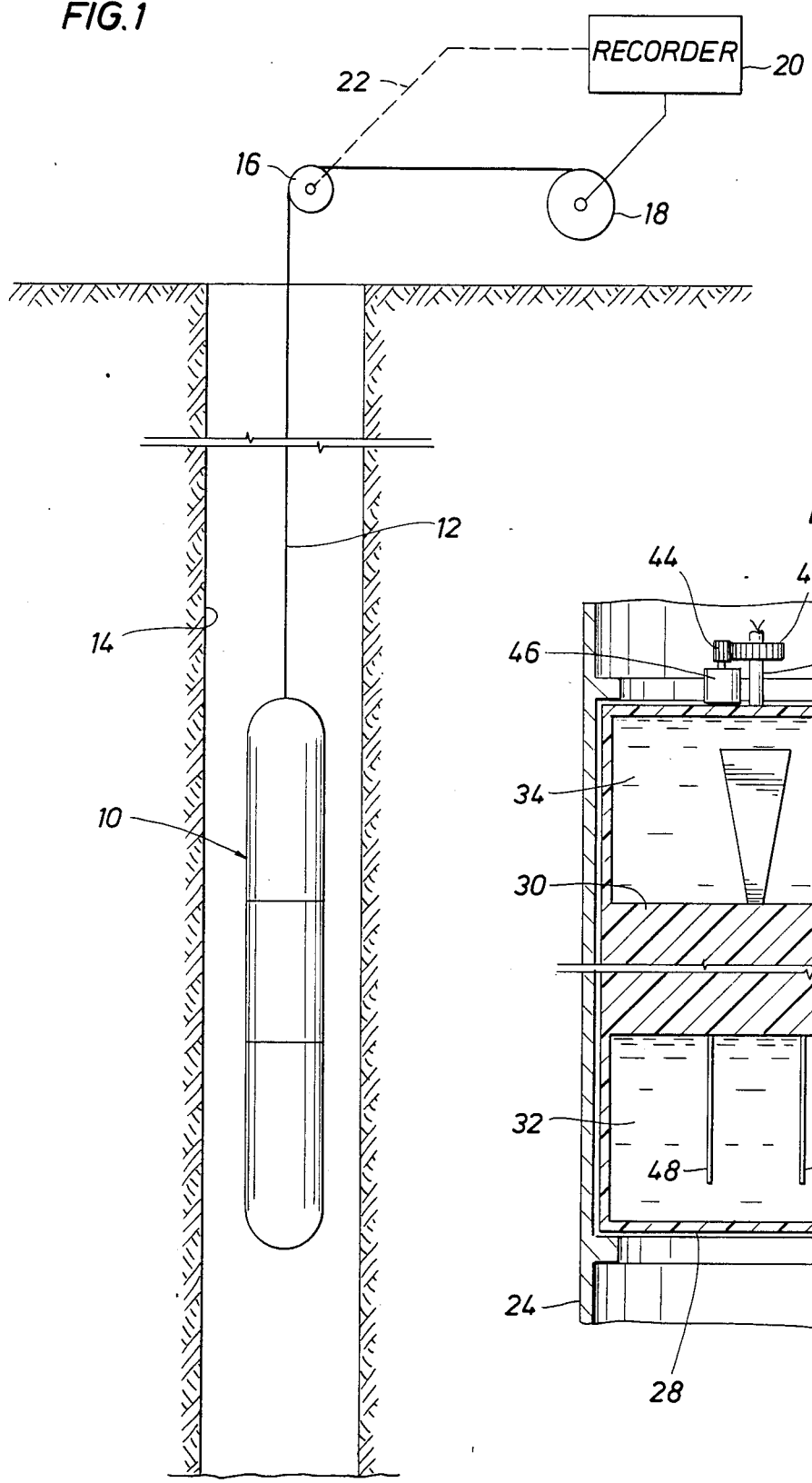
FIG. 1 shows a sonde in a borehole for obtaining logging data in accordance with the apparatus of this disclosure.

Attention is first directed to FIG. 1 of the drawings where the numeral 10 identifies a sonde adapted to be lowered on a logging cable 12. It is lowered into a borehole 14. The borehole can be several thousand feet deep. It is assumed that the borehole is vertical; sometimes, deviated wells are drilled where the borehole is more or less vertical but is deviated at a specified or controlled angle. Alternatively, the borehole 14 can be horizontal as in the case of boring into a mountain in the construction of tunnels through mountains.

Typically, the sonde is lowered to the bottom end of the borehole 14 and is retreived by pulling it up through the borehole on the logging cable 12. The cable extends to the top of the well and passes over a sheave 16. This directs the logging cable 12 to a reel 18 where it is spooled and stored. The cable 12 is typically a multiconductor cable. It relays power down to the sonde 10 for its operation, and it also includes conductors which transfer the data of interest to the equipment at the wellhead. The cable 12 is therefore connected to some type of data processing equipment and to a recorder 20. This includes a means for recording the data as the sonde traverses the borehole. An electrical or mechanical depth measuring system 22 is connected to the sheave 16 to relay information regarding the depth of the sonde 10 in the borehole so that the data recorded by the recorder is recorded as a function of depth. This enables the data to be correlated with depth in the borehole.

Figure 2:
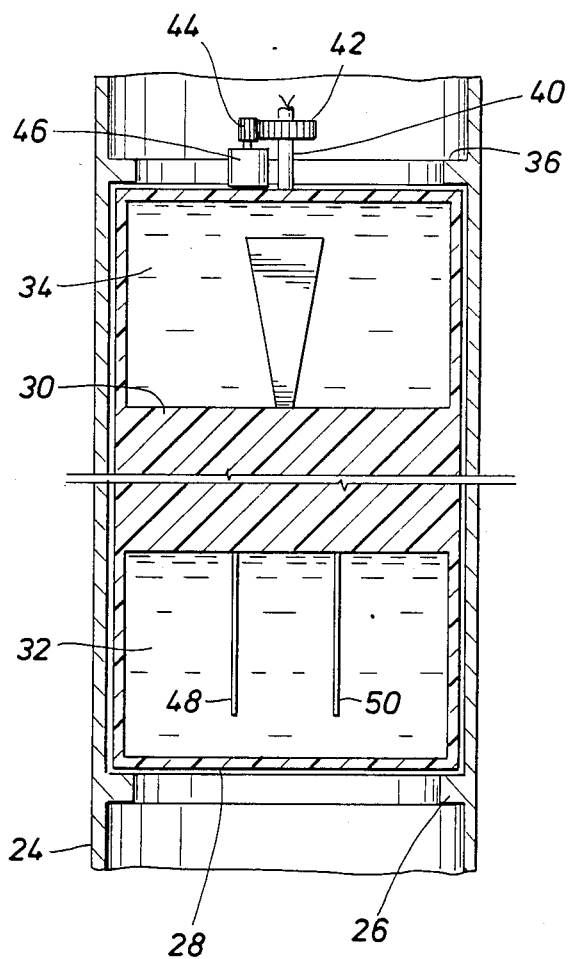
FIG. 2 is a sectional view through the sonde of FIG. 1 showing a deployment of an antenna system of dipoles within a housing, FIG. 2 being partially divided so that the lower half of FIG. 2 shows the antenna arrangement at 90° relative to the upper portion of FIG. 2.

The sonde incorporates several structural components. One of the important components is the antenna system of this apparatus which is better shown in FIG. 2. FIG. 2 is a sectional cut through the diameter of the tool showing the antenna system. In particular, FIG. 2 discloses a cylindrical housing 24. The cylindrical housing 24 includes an internally directed shoulder 26 which supports a closed cylindrical housing 28. The housing 28 is closed and sealed. This enables it to receive a liquid as will be discussed. The cylindrical housing 28 is an elongate cylindrical closed structure having a transverse central divider wall 30. It is an electromagnetically transparent material and preferably formed of a dielectric material. This defines a lower chamber 32. That chamber is similar to an upper chamber 34. The two chambers are adjacent to the transverse wall 30. The two chambers receive a liquid as will be described. The housing is captured between the lower shoulder 26 and a similar and matching upper shoulder 36.

The cylindrical housing 28 is captured between the two shoulders. Preferably, the internal of the tool is filled with a hydraulic oil and is exposed to a pressure compensating system so that interior of the tool operates at a pressure approximately equal to the external pressure experienced in the borehole. Pressure equalization across the wall of the tool avoids crushing the dielectric housing. It reduces the strength required for the sonde body. The housing 28 is thus captured between the shoulders and is free to rotate. If desired, it can be centered and supported on bearing assemblies at both shoulders. If desired, it can run in an oil bath on the exterior for reducing friction in rotation.

The housing 28 has an axial shaft 40 attached to it. The shaft 40 is attached at the center line. The shaft 40 supports a relatively large spur gear 42 which is driven by a pinion 44. That gear meshes with the spur gear 42 to rotate the shaft 40 and hence the housing 28. The pinion is driven by a motor 46 which is mounted by a bracket (not shown) affixed to the shoulder 36. The motor 46 is driven at a specified rate to rotate the housing. One suitable rate might be one rotation every six seconds, or 10 RPM. In light of the frequencies that are used in the antenna system, this rate of rotation is acceptable. Other rotational rates can be used. It is not necessary to stop rotation to transmit a pulse because the pulses are very short in duration compared to the rotational speed of the housing 28.

The chambers 32 and 34 are filled with a liquid having a relatively high dielectric constant. One suitable liquid is water which has a relative dielectric constant of about eighty. Pure ethylene glycol can be used which has a dielectric constant of about forty-four. A mix of the two liquids can be used to obtain an intermediate dielectric constant. Ethylene glycol is desirable because it can withstand high pressures and temperatures. If the device is to be exposed to elevated temperatures, this may limit the amount of water that can be placed in the chambers. That is, a high percentage of ethylene glycol must be used.

The ethylene glycol-water mixture is a desirable liquid filler. It is not merely a filler, but it is also an immersion medium for the antenna system to be described which changes the velocity of electromagnetic propagation. This change is in accordance with the well known relationship dependent on the square root of the relative dielectric constant, this referring to the surrounding material. It is acceptable to have a dielectric constant in the range of about forty-four to about eighty.

A high dielectric constant can be achieved with solids. For instance, solids such as barium titanate and other ferroelectric ceramics can be used to obtain dielectric constant as high as about 1,000 to about 3,600.

The chambers 32 and 34 are filled. These chambers receive and enclose the antenna elements. In the preferred embodiment, the antenna system comprises a pair of parallel dipoles. They are preferably constructed of flat triangular stock, and are often referred to as bow-tie dipoles. Preferably, two dipoles are used. Their spacing and relative dimensions are such that they typically operate as transient pulse radiators with a frequency band width of about thirty to about 300 MHz. This range is the preferred range for operation of the system. The optimum center frequency is about 100 MHz. With this in view, this accomodates relatively small dimensions. The dipoles are thus indicated at 48 and 50.

The organization of FIG. 2 should be noted. The top chamber 34 shows the dipole antennas from a side view, emphasizing the triangular construction. There are two antennas of identical construction, but one is obscured by the other in the top portion of FIG. 2. The dividing line across FIG. 2 indicates that the bottom portion of the drawing has been rotated by 90° to permit a side view of the dipoles. Again, the dipoles are indicated at 48 and 50.

More will be noted concerning the operating frequency, the physical spacing of the dipoles 48 and 50 and time sequence of the signals applied to the two dipoles.

Figure 3:
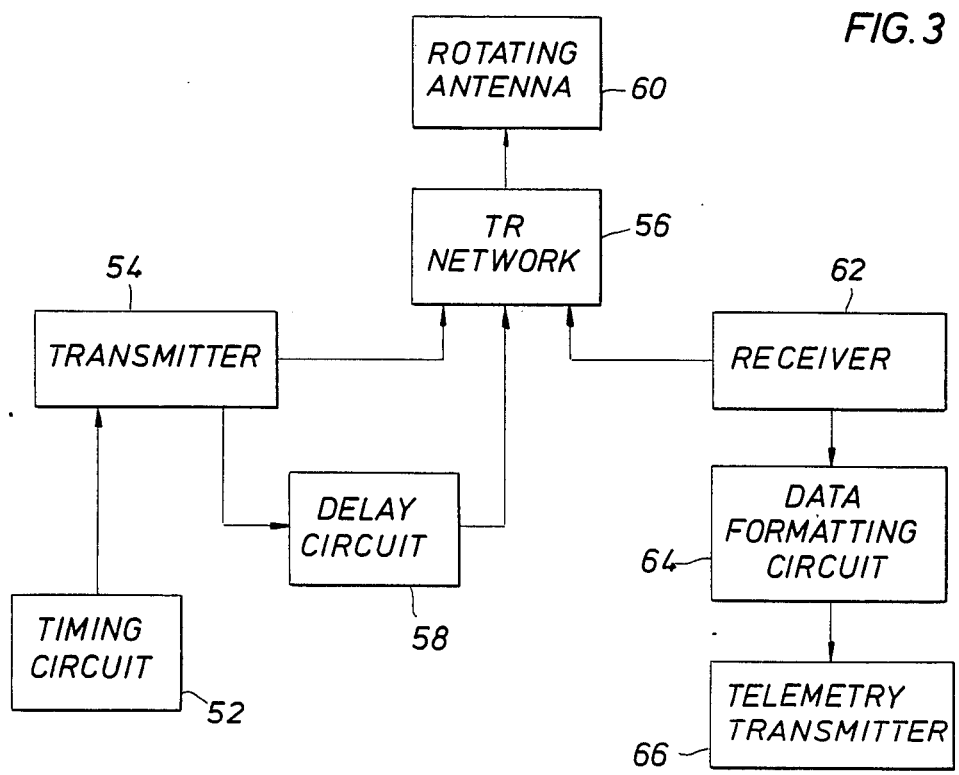
FIG. 3 is a schematic block diagram of the system in the sonde of FIG. 1.

Attention is next directed to FIG. 3 of the drawings. There, a schematic block diagram sets forth the preferred structure. First of all, there is a timing circuit at 52. It forms signals applied to a transmitter 54. The transmitter 54 forms an output pulse. Preferably, the output pulse is a single cycle having the frequency designated above, the preferred frequency being about 100 MHz. The signal is applied to a transmit and receive network 56. In addition, the signal is applied to a delay circuit 58. The amount of delay will be discussed on describing FIG. 4. Briefly, the TR network 56 provides output signals for the rotating antenna system shown in FIG. 2, that system being indicated generally by the numeral 60.

The antenna system provides a received signal. The TR network operates at the proper time to connect the rotating antenna 60 to a receiver 62 so that a particular time synchronized period is enabled for receipt of the signal from the reflective source adjacent to the borehole. The received data in the form of a signal is delivered by the receiver 62 to a data formatting circuit 64. This circuit in turn connects to a telemetry transmitter 66. The transmitter 66 provides an output signal on the logging cable 12. The output signal is transferred over the logging cable 12 back to the surface.

Figure 4:
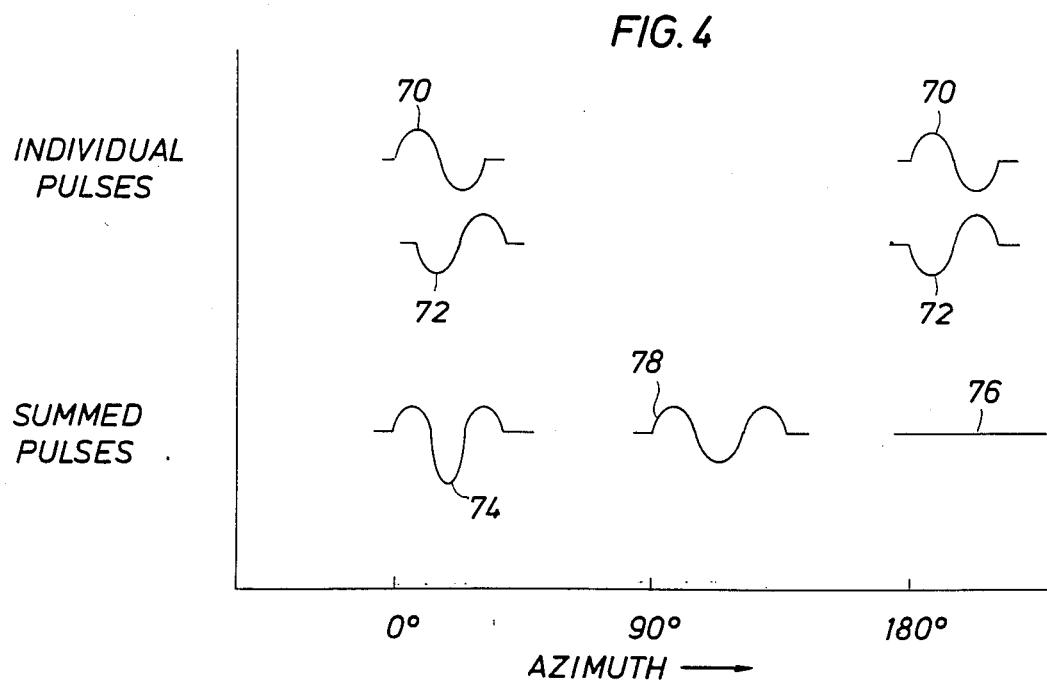
FIG. 4 shows the pulses applied to the individual antenna dipoles and the sums thereof at relative azimuthal angles.

Attention is now directed to FIG. 4 of the drawings. FIG. 4 shows the relative phasing of the preferred output pulses. It should be recalled on review of FIG. 4 that the two antennas are of the bow-tie construction being fabricated of flat triangular stock. They are preferable for short transient pulse radiation. They are preferably connected with the transmitter as resistively loaded dipoles. In the infinite homogeneous medium (referring to the surrounding liquid) the antenna system is essentially a two-element unidirectional end fire antenna array. In a short pulse excitation mode, and preferably with a one cycle wave, the radiation pattern is best shown in FIG. 1. In FIG. 4, the front dipole is provided with the pulse 70. The back dipole is provided with the pulse 72. There is a one quarter cycle timing relationship between the two. Also, the delay circuit inverts the pulse applied to the second dipole. However, time delay is also obtained by the spacing of the two antenna dipoles. The travel time related to propagation in the forward direction introduces an additional one quarter cycle time delay. Accordingly, the negative going peaks of the signals 70 and 72 add to form the large negative going peak 74 shown in FIG. 4. In the forward direction or at the zero direction as marked in FIG. 4, the two signals applied to the two separate dipoles are thus time shifted and inverted relative to one another so that they add in the wave form shown at 74 thereby providing a large pulse in the desired or forward direction.

Consider the opposite azimuthal propagation. Consider the pulses 70 and 72 as viewed from the 180° azimuth. Recalling that they were shifted in time by one quarter cycle timing as available from the TR network 56, and further shifted by one quarter cycle timing because of the spacing of the two antennas in the housing, this yields time coincidence of the two opposite polarity pulses causing the two radiated signals to cancel in the reverse direction. Thus, the pulses 70 and 72 add ideally to a zero radiation signal at 76. This output signal is zero in the ideal case in the backward radiation direction of the antenna system.

At the 90° azimuth angle, the two signals add to yield the pulse form 78. This is accomplished on both sides. That is, this is accomplished at the 90° azimuth angle and also at the 270° azimuth angle.

To summarize, FIG. 4 shows a system whereby a large pulse is transmitted in the forward direction and a null is observed 180° or in the reverse direction. The lateral pulses are relatively smaller. While they are not zero, they are diminished in size compared to the pulse in the forward direction.

To summarize the phasing accomplished by the two-dipole antenna system, the delay circuit introduces a quarter cycle time delay, and the spatial relationship of the two dipoles introduces another quarter cycle time delay. The two cycle time delays are additive in the forward direction, thereby yielding a pulse in the forward direction of substantial amplitude. A null is experienced in the reverse direction.

In summary, the antenna system works quite well to provide relatively narrow electromagnetic illumination. The illumination is not so broad in azimuth as to avoid definition. On the other hand, the beam is sufficiently wide that a few scanning points around a full circle can be used. It has been tested and approximately eight data points described in a full circle are a suitable output signal. The transmitted signals preferably have peak energy at about 100 MHz, and through the use of only a single cycle, exceedingly high speed operation can be obtained. The antenna system shown in FIG. 2 is preferably rotated at some desired rate such as 10 RPM. This enables it to obtain data in a full circle around the probe in six seconds. A faster rate of operation can be used so that the data can be recorded while the probe is pulled along the well, referring to the fact that the sonde may be moved continuously.

It will be observed that the two-dipole array of antennas transmit electromagnetic waves. Signals can be received by using only the front antenna. The return signal is received predominantly from the forward direction. The return signal is reflected from the structural anomaly which provides the reflection. In this light, the front antenna is connected to the receiver 62.

As described in detail above, the apparatus particularly enables RF mapping of anomalies near the borehole. The time of operation of the receiver is limited so that the time duration of return signals is limited. It will be kept in mind that the relative transmission of RF signals through the earth is somewhat limited. For instance, at 100 MHz, the wavelength in air is three meters but it is only about 1.5 meters in the earth. The antenna array chosen for this structure enables a signal to be transmitted and reflections to be received from distance of up to a few meters. The relative absorption of the medium is a limiting factor on the propagation distance into the earth. The system set forth hereinabove is thus able to test and provide data utilizing the antenna system set forth which has a front to back ratio of about ten to one and a half power beam width of approximately 90° in limestone.

One alternative to the present apparatus is to use a single transmitter connected to both antennas and also to incorporate the delay circuit 58. Another alternative is to use separate pulse forming transmitter circuits which are timed in synchronization with one another to provide the inversion and quarter cycle time shift shown in FIG. 4.

The foregoing is directed to the preferred embodiment but the scope thereof is determined by the claims which follow.

What is claimed is:

1. For use in detecting anomalies in geologic formations adjacent to a borehole in which a test apparatus is positioned, a test apparatus comprising:
   (a) a sonde having a axis along the length of the sonde and adapted to be selectively positioned at a desired point along a borehole;
   (b) pulse radiating antenna means mounted within a chamber means of said sonde for radiating a pulse outwardly from said chamber means in said sonde;
   (c) pulse forming transmitter means for providing a periodic pulse enabling said antenna means to radiate pulses;
   (d) wherein said antenna means includes a pair of parallel radiating dipole antennas parallel to the sonde axis driven by said transmitter means wherein said dipoles emit pulses azimuthly having timing and phasing to add and reinforce forwardly and having timing and phasing 180° from the forward direction to thereby tend to cancel; and
   (e) means connected to said antenna means for receiving return signals from the formation through said antenna means.

2. The apparatus of claim 1 wherein said wherein said chamber means is filled with a liquid material having a high relative dielectric constant to thereby shorten transmitted pulse wavelength.

3. The apparatus of claim 2 including a central antenna mount in said chamber means supporting symmetrically located antenna halves on opposite sides of said antenna mount, said antenna halves both being surrounded by the high dielectric constant material.

4. The apparatus of claim 1 further including means for rotating said antenna means through an angle in excess of 180° in aximuth.

5. The apparatus of claim 4 including rotor means externally of an elongate cylindrical housing in said sonde and comprising said chamber means, said antenna means being positioned in said cylindrical housing for rotation by said rotor means.

6. The apparatus of claim 5 including time delay means delaying arrival of a pulse to be transmitted, said antenna means comprising first and second dipoles respectively driven by a pulse and delayed pulse.

7. The apparatus of claim 6 including an antenna coupling circuit connected between said dipoles and said transmitter means.

8. The apparatus of claim 7 wherein said antenna means includes means for securing said dipoles in a relatively fixed position.

9. The apparatus of claim 1 including means for timing operation of two separate dipoles comprising said antenna means, and further wherein said two dipoles are spaced apart by a distance such that the cumulative propagation delay of pulses from said two dipoles is one quarter cycle of timing, and further wherein the pulses radiated from said dipoles are timed to add and reinforce in the direction common to both dipoles in the forward radiation azimuth.

10. The apparatus of claim 1 wherein said transmitter means has a frequency in the range of about 30 to about 300 MHz and the pulse applied to said antenna means is a one cycle wave.

11. The apparatus of claim 10 wherein said antenna means comprises a pair of spaced, parallel dipoles in a housing having a material therein surrounding said dipoles and having a relative dielectric of up to about 80.

12. The apparatus of claim 11 wherein said sonde fits within a borehole sized according to industry standards and having a diameter as small as 4¾ inches.

13. The apparatus of claim 12 wherein said sonde has a diameter of 3 inches or less.

14. The apparatus of claim 11 wherein said dipoles are resistively loaded flat triangular dipole halves supported on opposite sides of support means in said container.

15. The apparatus of claim 1 wherein said transmitter means has a frequency in the range of about 30 to about 300 MHz and the pulse radiated from said antenna means is one cycle wave.

16. The apparatus of claim 15 wherein said antenna means comprises a pair of spaced, parallel dipoles in a said chamber means having a liquid material therein surrounding said dipoles and having a relative dielectric constant of up to about 80.

17. The apparatus of claim 16 wherein said dipoles are resistively loaded flat triangular dipole halves supported on opposite sides of support means in said chamber means.

18. The apparatus of claim 17 wherein said dipoles are spaced apart by a distance such that the cumulative propagation delay of pulses from said two dipoles is one quarter cycle, and further wherein the pulses radiated from said dipoles are of timed to add and reinforce in the direction common to both dipoles in azimuth.

* * * * *